United States Patent [19]

Chopin et al.

[11] Patent Number: 5,106,607

[45] Date of Patent: * Apr. 21, 1992

[54] MULTILOBAR CATALYSTS FOR THE CONVERSION OF SULFUR CONTAINING GASEOUS EFFLUENTS

[75] Inventors: Thierry Chopin, Saint-Denis; Eric Quemere, Cormeilles en Parisis; Patrice Nortier, Romainville, all of France

[73] Assignee: Rhone-Poulenc Chimie, Courbevoie, France

[*] Notice: The portion of the term of this patent subsequent to Aug. 15, 2006 has been disclaimed.

[21] Appl. No.: 495,597

[22] Filed: Mar. 19, 1990

Related U.S. Application Data

[62] Division of Ser. No. 289,322, Dec. 23, 1988, abandoned.

[30] Foreign Application Priority Data

Dec. 23, 1987 [FR] France .................................. 87 18010

[51] Int. Cl.$^5$ ........................ C01B 17/04; C01B 17/16
[52] U.S. Cl. .............................. 423/564; 423/574 R; 423/576; 423/DIG. 13; 502/527
[58] Field of Search ........... 502/527; 423/564, 574 R, 423/576, DIG. 13

[56] References Cited

U.S. PATENT DOCUMENTS

| | | | |
|---|---|---|---|
| 3,966,644 | 6/1976 | Gustafson | 502/527 |
| 4,388,288 | 6/1983 | Dupin et al. | 423/576 |
| 4,391,740 | 7/1983 | Gibson | 502/527 |
| 4,534,855 | 8/1985 | Silverman | 502/527 |
| 4,548,912 | 10/1985 | Helfinger et al. | 502/68 |
| 4,840,932 | 6/1989 | Matsuura et al. | 502/527 |
| 4,857,296 | 8/1989 | Brunelle et al. | 423/576 |

FOREIGN PATENT DOCUMENTS

| | | | |
|---|---|---|---|
| 3539195 | 5/1986 | Fed. Rep. of Germany | 502/527 |
| 218735 | 2/1985 | German Democratic Rep. | 502/527 |
| 30491 | 3/1978 | Japan | 502/527 |
| 2193907 | 2/1988 | United Kingdom | 502/527 |

OTHER PUBLICATIONS

Fulton, "Selecting The Catalyst Configuration", *Chemical Engineering*, May 12, 1986, pp. 97–101.

*Primary Examiner*—Jeffrey E. Russel
*Attorney, Agent, or Firm*—Burns, Doane, Swecker & Mathis

[57] ABSTRACT

Multilobar shaped catalyst particulates, e.g., tri- or quadrilobar particulates, well adapted for the catalytic conversion of gases containing compounds of sulfur, e.g. $SO_2$, $H_2S$, COS and/or $CS_2$, by the Claus reaction and/or by hydrolysis, are comprised of a catalytically effective amount of values catalytically active in the Claus reaction and/or reactions entailing hydrolysis of organosulfur compounds.

20 Claims, No Drawings

MULTILOBAR CATALYSTS FOR THE CONVERSION OF SULFUR CONTAINING GASEOUS EFFLUENTS

This application divisional of application Ser. No. 07/289,322, filed Dec. 23, 1988, now abandoned.

BACKGROUND OF THE INVENTION

1. Field of the Invention

The present invention relates to novel catalysts for the treatment of gases, in particular industrial gaseous effluents containing sulfur compounds, in order to produce elemental sulfur.

This invention especially relates to novel catalysts for the Claus reaction and/or the hydrolysis reaction of organosulfur compounds.

2. Description of the Prior Art

In the conventional Claus process, to which the present invention is not limited, the recovery of sulfur from gases containing hydrogen sulfide and possibly organosulfur derivatives, comprises two stages.

In a first stage, the hydrogen sulfide is burned in the presence of a controlled amount of air to convert a part of the hydrogen sulfide into sulfur dioxide and then, in a second stage, the resulting gaseous mixture is transferred into converters arranged in series, comprising a catalyst bed, on which the Claus reaction takes place:

$$2H_2S + SO_2 \longrightarrow 3S + 2H_2O$$

In addition to hydrogen sulfide, the gases may contain organic sulfur compounds, such as $CS_2$ and COS, which are generally stable at the level of catalytic converters and which contribute 20 to 50% of the $SO_2$ and sulfur compound emissions into the atmosphere following the incineration of the fumes. These very harmful compounds are already contained in the gas to be treated, or are formed in the course of the first oxidation stage.

These compounds may be eliminated by different types of reaction, in particular by hydrolysis according to the reactions (2):

$CS_2 + 2H_2O \rightarrow CO_2 + 2H_2S$ $CS_2 + H_2O \rightarrow COS + H_2S$ $COS + H_2O \rightarrow CO_2 + H_2S$     (2)

These reactions also take place on a catalytic bed, advantageously using a catalyst based on titanium, cerium oxide, zirconium oxide or alumina.

They generally occur simultaneously with the Claus (1) reaction in the converters.

The catalyst beds heretofore employed consisted of catalyst particles in the form of cylindrical or spherical granules formed by molding or extrusion. However, the elemental sulfur production and organic sulfur compound conversion rates obtained with the cylindrical or spherical granules formed by molding or extrusion are lower than the theoretical rates calculated by the laws of thermodynamics.

SUMMARY OF THE INVENTION

Accordingly, a major object of the present invention is the provision of novel multilobar catalysts which conspicuously ameliorate the above disadvantages and drawbacks to date characterizing the state of this art, and which give rise to lower losses for identical filling coefficients of the converters.

Furthermore, the performance of the shaped catalysts of the invention is appreciably improved, both relative to the Claus reaction and the hydrolysis of organic sulfur compounds.

Indeed, this improvement may be explained by the fact that the Claus reactions (1) and the hydrolysis reactions (2) are limited by the phenomenon of diffusion of material into the catalyst particles.

For this reason, not all of the catalytically active sites of the catalyst particles are in contact with the gases to be treated, in particular those located at the core of the particle. The theoretical activity of the catalyst, thus, is not obtained.

Briefly, the present invention features shaped catalysts for the treatment of gases containing sulfur compounds, to produce elemental sulfur, comprising, as an essential component, an element which catalyzes the Claus reaction and/or the hydrolysis of organic sulfur compounds, and the shape of which is a transverse section in the form of a multilobe.

DETAILED DESCRIPTION OF THE PREFERRED EMBODIMENTS OF THE INVENTION

More particularly according to the present invention, in a first embodiment thereof, the transverse section of the catalyst is circumscribed in a circle having a diameter of from about 1.2 mm to about 9 mm. The lobes of the transverse section are preferably identical, relative to dimensions and/or shape.

In a second embodiment of the invention, the transverse section of the catalyst is circumscribed by an oval having a major axis ranging from approximately 2 mm to 9 mm, and a minor axis of from about 1.2 mm to 7 mm. At least one of the lobes of the multilobar shaped article is different in form and/or dimensions from the other lobes. Preferably, pairs of lobes are identical and advantageously the identical lobes are not adjacent.

In another embodiment of the invention, common to both embodiments described above, the lobes of the multilobe shape are secant. However, in one variant of this embodiment of the invention, at least two adjacent lobes of the multilobe shape are not secant.

In a preferred embodiment of the invention, the multilobe shapes are either three of four lobes.

According to a novel characteristic of the invention, the catalyst has, in its transverse section, at least one orifice or longitudinal channel opening at both ends of the catalyst, said orifice preferably being cylindrical in shape.

In a preferred embodiment, the catalyst contains a center channel and a channel at the center of each lobe.

The catalyst of the invention comprises, as the essential component, a catalytically active element selected from among aluminum oxide, titanium dioxide, cerium oxide, zirconium oxide, or a mixture thereof. The proportion by weight of the catalytically active element, relative to the total weight of the final product catalyst, may range from 0.5% to 100% and preferably from 60% to 99%.

For example, titanium dioxide may be used either alone or in admixture with other oxides, such as alumina, silica, zirconium oxide, cerium oxide, tin oxide, oxides of trivalent rare earths, molybdenum oxide, cobalt oxide, nickel oxide, iron oxide, or the like. The same is true for the cerium oxide, zirconium oxide and alumina.

The oxides of the catalytically active element described above as suitable for the invention are all catalytically active oxides of said element, regardless of their mode of preparation or origin.

The catalysts of the invention may further contain one or more components selected from among the clays, silicates, sulfates of an alkaline earth metal or ammonium, ceramic, asbestos or silica fibers.

They may also contain additives and adjuvants to facilitate their forming and additives to improve their final mechanical properties.

Exemplary of such additives, representative are cellulose, carboxymethyl-cellulose, carboxyethyl-cellulose, tall oil, xanthan gums, surface active agents, flocculating agents such as the polyacrylamides, carbon black, starches, stearic acid, polyacryl alcohol, polyvinyl alcohol, biopolymers, glucose, polyethylene glycols, and the like.

For example, the catalysts described in European Patents Nos. 60,741, 172,972, FR 2,224,203, 2,190,517, and French Applications Nos. 86/06,261 and 86/14,888, are representative.

In another embodiment of the invention, the catalytically active element is impregnated onto a generally refractory support.

Examples of suitable such support are alumina, silica, cerium oxide, zirconium oxide and titanium dioxide.

The catalyst of the invention may be prepared by various known techniques for the preparation of catalysts, then formed according to the invention.

Thus, for example, the catalyst may be produced by kneading together the different components of the catalyst and extruding the mineral paste obtained. It is possible to obtain either a so-called "solid" catalyst containing the oxide of the catalytically active element whether or not bonded to at least one of the oxides, such as alumina, zirconium, oxide, cerium oxide, tin oxide, titanium dioxide or oxides of trivalent rare earths, or a so-called "impregnated" catalyst obtained by impregnation with a solution of an aluminum, zirconium, cerium, tin, titanium, or rare earth compound, or other compounds, comprising the oxide of the catalytically active element, for example titanium dioxide, and shaped according to the invention.

These preparative techniques are given as illustrations only. It is possible, without exceeding the scope of the invention, to use any method for shaping a powder or a paste into a particular form, for example by molding or compacting.

In order to further illustrate the present invention and the advantages thereof, the following specific examples are given, it being understood that same are intended only as illustrative and in nowise limitative.

EXAMPLE 1

Catalyst A

To a suspension of titanium oxide obtained after hydrolysis and filtration, in the conventional process of the sulfuric acid decomposition of ilmenite, a suspension of lye was added to neutralize all of the sulfates. The suspension was dried at 150° C. for 1 hour. The resulting powder was mixed in the presence of water and nitric acid, in the following proportions:

(i) $TiO_2$: 54%
(ii) $HNO_3$: 6%
(iii) $H_2O$: 40%

The paste obtained in this manner was extruded through a die to produce an extrusion having a trilobar shape, having a diameter of the circumscribed circle of 4 mm and the identical and secant lobes had a diameter of 1.8 mm.

After drying at 120° and calcining at 450° C., the extrusions had the following properties:

(a) Diameter of the circumscribed circle: 4 mm
(b) Specific surface: 118 $m^2/g$
(c) Total pore volume: 0.34 $cm^3/g$

EXAMPLE 2

Catalyst B

Using the paste of Example 1, extrusions were prepared having a trilobar form, with a diameter of the circumscribed circle of 1.5 mm and the identical and secant lobes having a diameter of 0.8 mm.

After drying at 120° C. and calcination at 450° C., the extrusions had the following properties:

(a) Diameter of the circumscribed circle: 1.5 mm
(b) Specific surface (BET): 124 $m^2/g$
(c) Total pore volume: 0.32 $cm^3/g$

EXAMPLE 3

Catalyst C

An extrusion of a trilobar shape was prepared as in the two preceding examples. The diameter of the circumscribed circle was 7 mm; the diameter of the secant lobes was 3 mm.

After drying at 120° C. and calcining at 450° C., the extrusions had the following properties:

(a) Diameter of the circumscribed circle: 7 mm
(b) Specific surface (BET): 120 $m^2/g$
(c) Total pore volume: 0.33 $cm^3/g$

EXAMPLE 4

Catalyst D

The paste of Example 1 was extruded through a die to produce a quadrilobar shape, the opposing lobes of which were identical and the transverse section of which was circumscribed by an oval having a major axis of 4 mm and a minor axis of 2 mm. The diameter of the large lobes was 1.8 mm; that of the small lobes was equal to 1 mm.

After drying at 120° C. and calcination at 450° C., the extrusions had the following characteristics:

(a) Major axis of the oval: 4 mm
(b) Minor axis of the oval: 2 mm
(c) Specific surface: 116 $m^2/g$
(d) Pore volume: 0.35 $cm^3/g$

COMPARATIVE EXAMPLE

Catalyst E

A paste was prepared as in Example 1. This paste was then extruded through a cylindrical die having a diameter of 4 mm.

The extrusions obtained were dried at 120° C. and calcined at 450° C.

The catalyst E had the following characteristics:

(a) Diameter: 4 mm
(b) Specific surface: 120 $m^2/g$ (c) Total pore volume: 0.35 cm$^3$/g

Catalytic Test I

The purpose of this catalytic test was to compare the activities of the catalysts in the hydrolysis of organic sulfur compounds, and more particularly of COS and CS$_2$.

Into a reactor, a gas having the following composition, by volume, was introduced:

H$_2$S: 6%
SO$_2$: 4%
CS$_2$: 1%
H$_2$O: 30%
N$_2$: 59%

In an isothermal operation, at a temperature of 330° C., and for an identical volume of the reactor filled with the catalyst, the volume velocity of the gases was equal to 2,400 h$^{-1}$, calculated under normal conditions of temperature and pressure. The contact time of the gases was 1.5 sec.

The catalysts were compared by measuring the hydrolysis activity by analyzing, by means of gas phase chromatography, the gases at the outlet of the reactor, to determine the percentage of conversion of the organic sulfur compounds.

The results are reported in Table I:

TABLE I

| Catalyst | % CS$_2$. COS |
|---|---|
| A | 94% |
| B | 99% |
| C | 86% |
| D | 92% |
| E | 84% |

These results clearly show the superiority of the catalysts of the invention.

Catalytic Test II

The purpose of this catalytic test was to compare the activities of the catalysts for the Claus reaction (1).

Into a reactor or converter, a gas having the following composition by volume, was introduced:

H$_2$S: 6%
SO$_2$: 3%
H$_2$O: 30%
N$_2$: 61%

In an isothermal operation at a temperature of 330° C. and for an identical volume of the reactor filled with the catalyst, the volume velocity of the gases was equal to 1×2,000 h$^{-1}$, calculated under normal temperature and pressure conditions. The contact time of the gases was 0.3 sec.

The activity of the catalysts was measured by the gaseous phase chromatography at the inlet and the outlet of the reactor and by the determination of the percentage of hydrogen sulfide converted.

The results are reported in Table II:

TABLE II

| Catalyst | % H$_2$S converted |
|---|---|
| A | 65 |
| B | 68 |
| C | 62 |
| D | 64 |
| E | 60 |

As in Catalytic Test I, the results show the superiority of the catalysts of the invention. The difference between the different proportions of conversion for the Claus reaction is small, as even the conversion proportions obtained were close to the maximum conversions determined by the laws of thermodynamics, under the conditions of the concentration, velocity and contact time of the gases of the example.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. In a process for the catalytic conversion of gases containing compounds of sulfur to produce elemental sulfur by the Claus reaction, the improvement which comprises, utilizing as the catalyst therefore, multilobar shaped catalyst particulates adapted for the catalytic conversion of gases containing compounds of sulfur, said multilobar particulates comprising a catalytically effective amount of an element catalytically active in the Claus reaction and/or the hydrolysis of organosulfur compounds.

2. In a process for the catalytic conversion of gases containing organosulfur compounds by hydrolysis thereof, the improvement which comprises, utilizing as the catalyst therefor, multilobar shaped catalyst particulates adapted for the catalytic conversion of gases containing compounds of sulfur, said multilobar particulates comprising a catalytically effective amount of an element catalytically active in the Claus reaction and/or the hydrolysis of organosulfur compounds.

3. The process as defined by claim 1, said multilobar catalyst particulates comprising a catalytic bed.

4. The process as defined by claim 2, said multilobar catalyst particulates comprising a catalytic bed.

5. The process as defined by claim 1, wherein the transverse section of said multilobar catalyst particulates is circumscribed in an oval having a major axis ranging from about 2 to 9 mm and a minor axis ranging from about 1.2 to 7 mm.

6. The process as defined by claim 1, wherein the lobes defining said multilobar shape are essentially identical in the dimensions and/or form thereof.

7. The process as defined by claim 1, wherein at least one of the lobes defining said multilobar shape is different from the other lobes in the dimensions and/or form thereof.

8. The process as defined by claim 1, wherein at least two adjacent lobes defining said multilobar shape are secant.

9. The process as defined by claim 1, said multilobar shape comprising three lobes.

10. The process as defined by claim 1, said multilobar shape comprising four lobes.

11. The process as defined by claim 10, wherein the opposing lobes of said quadrilobar shape are essentially identical in the dimensions and form thereof.

12. The process as defined by claim 1, said multilobar particulates comprising at least one longitudinal channel therethrough.

13. The process as defined by claim 12, said multilobar particulates comprising a central channel and a channel extending through each of the lobes thereof.

14. The process as defined by claim 1, said catalytically active element comprising an oxide of titanium, cerium, zirconium, aluminum or mixture thereof.

15. The process as defined by claim 1, said multilobar catalyst particulates comprising from about 0.5 to 100 percent by weight of said catalytically active elements.

16. The process as defined by claim 15, said multilobar catalyst particulates comprising from about 60 to about 99 percent by weight of said catalytically active elements.

17. The process as defined by claim 1, said multilobar catalyst particulates comprising an alkaline earth metal or ammonium sulfate.

18. The process as defined by claim 1, said multilobar catalyst particulates comprising alumina, silica, clay, asbestos, ceramic fibers, or mixture thereof.

19. The process as defined by claim 1, said multilobar catalyst particulates comprising at least one oxide of cerium, zirconium, molybdenum, cobalt, silicon, trivalent rare earth, nickel, iron, tin, aluminum or titanium.

20. The process as defined by claim 1, wherein said catalytically active element is impregnated onto an alumina, silica, cerium oxide, zirconium oxide or titanium dioxide support.

* * * * *